United States Patent
Jarriel et al.

(12) 
(10) Patent No.: US 6,279,034 B1
(45) Date of Patent: Aug. 21, 2001

(54) DISTRIBUTED MONITOR TIMER SERVICE FOR USE IN A DISTRIBUTED COMPUTING ENVIRONMENT

(75) Inventors: Stuart Jarriel; Carey L. Jung; Michael McNally; Brian Jay Vetter, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/089,963

(22) Filed: Jun. 3, 1998

(51) Int. Cl.⁷ .................................................. G06F 15/173
(52) U.S. Cl. ............................................................. 709/223
(58) Field of Search .................................... 709/100, 102, 709/223, 224, 228, 400; 705/9

(56) References Cited

U.S. PATENT DOCUMENTS

| | | |
|---|---|---|
| 5,325,526 | 6/1994 | Cameron et al. . |
| 5,398,012 | 3/1995 | Derby et al. . |
| 5,475,838 * | 12/1995 | Fehskens et al. ................ 709/223 |
| 5,535,256 * | 7/1996 | Maloney et al. ................... 379/34 |
| 5,542,047 | 7/1996 | Armstrong . |
| 5,559,958 * | 9/1996 | Farrand et al. .................. 709/223 |
| 5,561,769 | 10/1996 | Kumar et al. . |
| 5,893,083 * | 4/1999 | Eshghi et al. ................... 709/224 |
| 5,946,375 * | 8/1999 | Pattison et al. ................... 379/34 |
| 5,999,179 * | 12/1999 | Kekic et al. ..................... 345/349 |
| 6,023,507 * | 2/2000 | Wookey ........................... 709/224 |
| 6,041,347 * | 3/2000 | Harsham et al. ................ 709/223 |

FOREIGN PATENT DOCUMENTS 9618257    6/1996   (WO) .

* cited by examiner

*Primary Examiner*—Robert B. Harrell
*Assistant Examiner*—Marc D. Thompson
(74) *Attorney, Agent, or Firm*—Duke W. Yee; Jeffrey S. LaBaw (57) ABSTRACT

A method of managing time expressions for use by applications in a distributed computer network having a management server servicing a set of managed computers. The method begins by defining a set of timers, with each timer preferably comprising an expression of logical operators with a set of one or more primitives as operands. The set of timers is stored in a hierarchical namespace associated with the management server. Preferably, the timers and primitives are stored separately in the hierarchical namespace, with the primitives indexed by name for prompt retrieval.

29 Claims, 5 Drawing Sheets

DISTRIBUTED MONITOR TIMER SERVICE FOR USE IN A DISTRIBUTED COMPUTING ENVIRONMENT

BACKGROUND OF THE INVENTION

1. Technical Field

The present invention is directed to managing a large distributed computer network and, more particularly, to providing centralized definition and storage of time-related expressions useful by distributed management applications that need to perform operations based on time schedules.

2. Description of the Related Art

Companies now desire to place all of their computing resources on the company network. To this end, it is known to connect computers in a large, geographically-dispersed network environment and to manage such an environment in a distributed manner. One such management framework comprises a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. As the number of managed nodes increases, the system maintenance problems also increase, as do the odds of a machine failure or other fault.

One goal of managing a large, distributed computer network is to automate as many of the management activities as possible. Automated management for a large managed network theoretically involves the initiation of pre-programmed actions in response to network events and the needs of various management applications and application facilities. Potentially, many distributed automated activities thus would be guided in some way by time. For example, it would be desirable to schedule management activity according to local policy. Moreover, responses to exceptional events might need to be different depending on when the event is generated. Further, activity queuing will normally rely on schedule information for throttling and bandwidth control.

Because time and schedules are so prominent in any consideration of distributed automated management, appropriate architecture and implementation of time and schedule services are critical. Time and schedule issues extend from the user interfaces provided for creation, viewing, and analysis of schedules, down to low-level considerations of implementation efficiency.

Prior art techniques have not adequately addressed the need to provide adequate definition and storage of time-related expressions. Thus, as the managed network environment grows in size, it is more difficult to synchronize management activities in a meaningful way. The present invention provides a mechanism for the expression of time and schedule information in a distributed automated management system.

BRIEF SUMMARY OF THE INVENTION

It is thus a primary object of this invention to support centralized definition and storage of time-related expressions to be used by distributed management applications that need to perform operations based on time schedules.

It is another primary object of this invention to define and store in a central location a set of timers that applications fetch for local use in a large, distributed computer network.

It is a further object of the present invention to provide a distributed monitor timer repository (STR) in which timers and associated primitives are organized, preferably in an indexed, hierarchical namespace.

It is still another object of the present invention to provide a set of distributed monitors a common data representation of a timer that all management applications can use.

Another important object of the invention is to define a schedule from a set of timers and to build-up or overlay multiple schedules (e.g., via Boolean operations) to build higher order schedules.

Thus, a more general object of this invention is to provide a distributed managed architecture with application independent definition/storage of timers.

These and other objects are provided in a method of managing time expressions for use by applications in a distributed computer network having a management server servicing a set of managed computers. The method begins by defining a set of timers, with each timer preferably comprising an expression of logical operators with a set of one or more primitives as operands. The set of timers is stored in a hierarchical namespace associated with the management server. Preferably, the timers and primitives are stored separately in the hierarchical namespace, with the primitives indexed by name. The logical operators include such operators as AND, OR, XOR and NOT. A given set of timers comprise a schedule, and a pair of schedules may also be combined to create a master schedule.

According to another aspect of the present invention, there is described a method of managing time expressions in a distributed computer network wherein a set of such timers is stored in a hierarchical namespace associated with the management server. In response to a request from a managed computer, a timer is selectively retrieved from the namespace and transmitted to the computer for local use.

According to another feature of the invention, a computer program product is provided for use in a computer connected in a distributed computing environment having a management server servicing a set of managed computers. The computer program product comprises suitable instruction means for storing a set of timers in a hierarchical namespace associated with the management server. As described above, each timer preferably comprises an expression of logical operators with a set of one or more primitives as operands. The product also includes instruction means for retrieving the timers for use by the managed computers.

According to yet another feature of the invention, a computer includes a memory that supports the hierarchical namespace for the set of timers. A computer program includes means for specifying each timer as an expression of logical operators with a set of one or more primitives as operands, and means responsive to a given request for retrieving a timer from the hierarchical namespace for use in a managed computer.

These and other objects of the invention are provided in a method of managing timers implemented within a distributed environment having a management server and a set of managed machines. A given subset of the managed machines include a distributed management infrastructure. In particular, each managed machine in the given subset includes a runtime environment, which is a platform-level service that can load and execute software agents. One or more software agents are deployable within the distributed environment to facilitate management, monitoring, administration and other control tasks. The runtime environment at a particular node includes a runtime engine, which executes a distributed monitor (DM).

This architecture provides for both proactive and reactive client/server management by providing a way to schedule and to respond to events received from applications and devices in the network. At the core of the service is the runtime engine that is used to interpret and evaluate event-oriented rules and launch response tasks. This same engine is also responsible for launching scheduled operations as well as executing software agents on demand.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
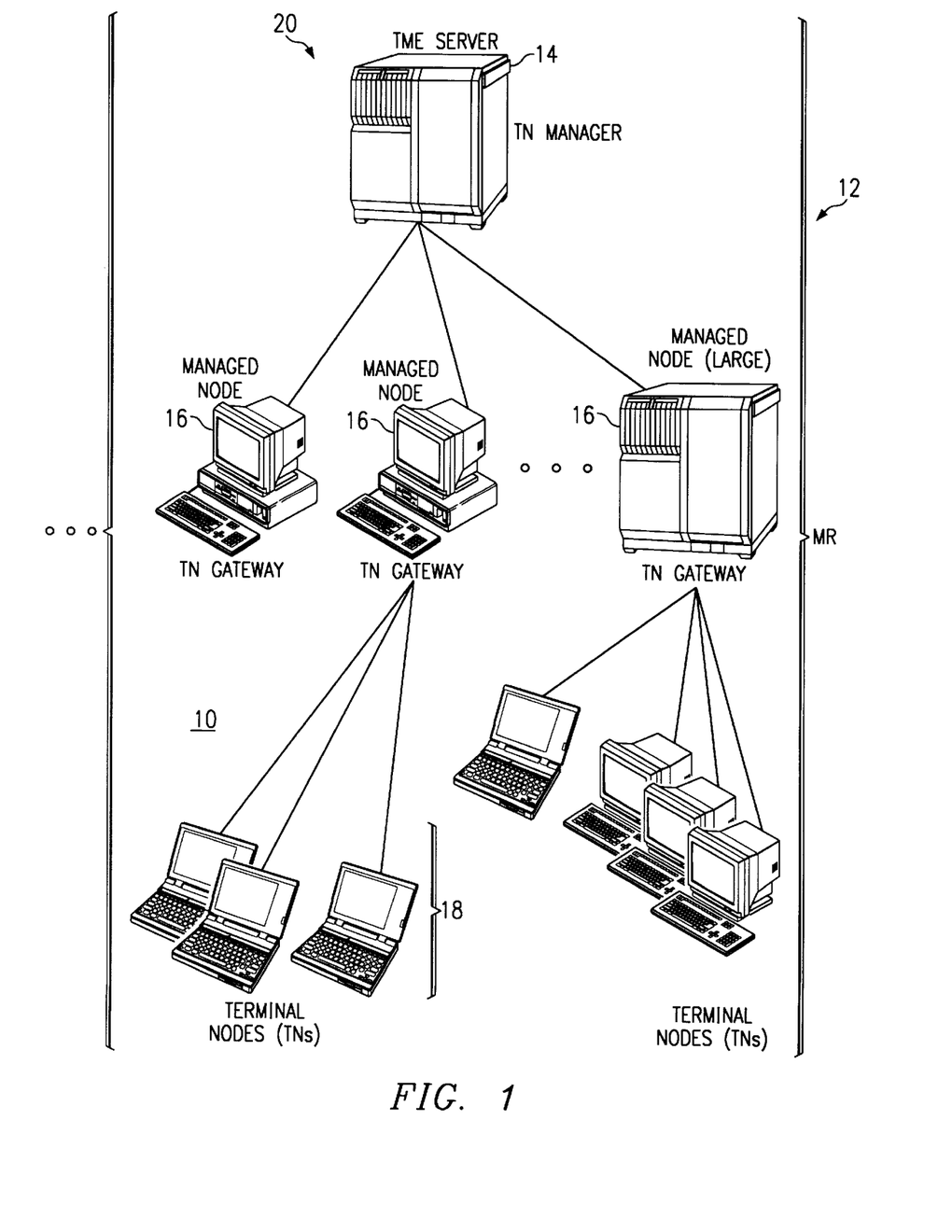
FIG. 1 illustrates a simplified diagram showing a large distributed computing enterprise environment in which the present invention is implemented.

Referring now to FIG. 1, the invention is preferably implemented in a large distributed computer environment 10 comprising up to hundreds or even thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, threads servers, time servers and the like. Multiple servers 14 coordinate activities across the enterprise and permit remote site management and operation. Each server 14 serves a number of gateway machines 16, each of which in turn support a plurality of endpoints 18. The server 14 coordinates all activity within the MR using a terminal node manager 20.

As will be discussed below, each managed region (MR) preferably includes a single repository, which is referred to herein as a distributed monitor timer repository (STR) 15, comprising a set of objects and libraries used to support centralized definition and storage of time-related expressions according to the present invention. The STR facilitates application-independent definition/storage of timers. Thus, timers are defined and stored centrally in the managed region, with applications fetching copies of the definition for local use as needed. When an application has retrieved a timer, preferably it will use STR library functions to manipulate the timer.

Figure 2:
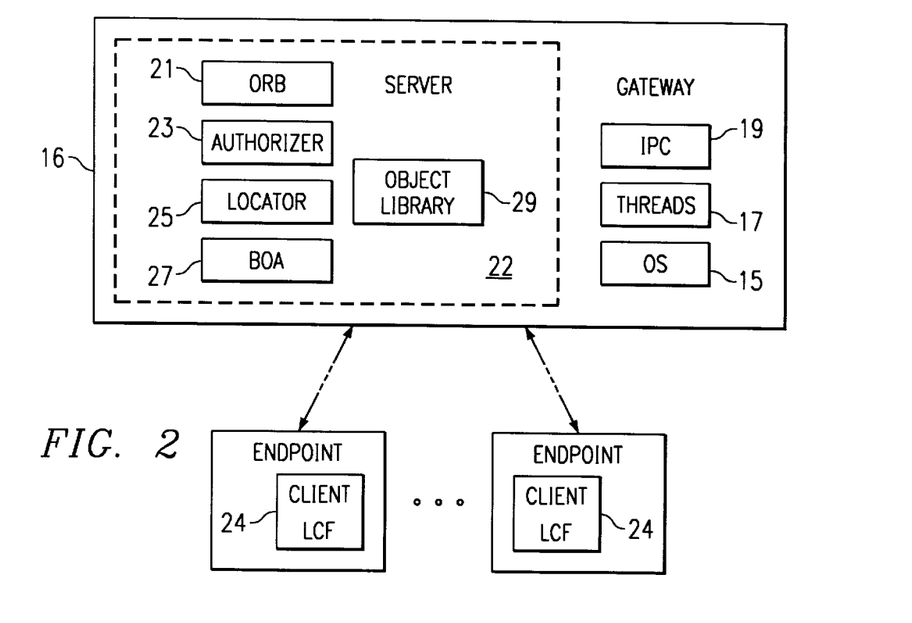
FIG. 2 is a block diagram of a preferred system management framework illustrating how the framework functionality is distributed across the gateway and its endpoints within a managed region.

Referring now to FIG. 2 for further background, each gateway machine 16 runs a server component 22 of a system management framework. The server component 22 is a multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it is communicates with both server and client processes through separate stubs and skeletons via an interprocess communication (IPC) facility 19. In particular, a secure remote procedure call (RPC) is used to invoke operations on remote objects. Gateway machine 16 also includes an operating system 15 and a threads mechanism 17.

The system management framework includes a client component 24 supported on each of the endpoint machines 18. The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 3:
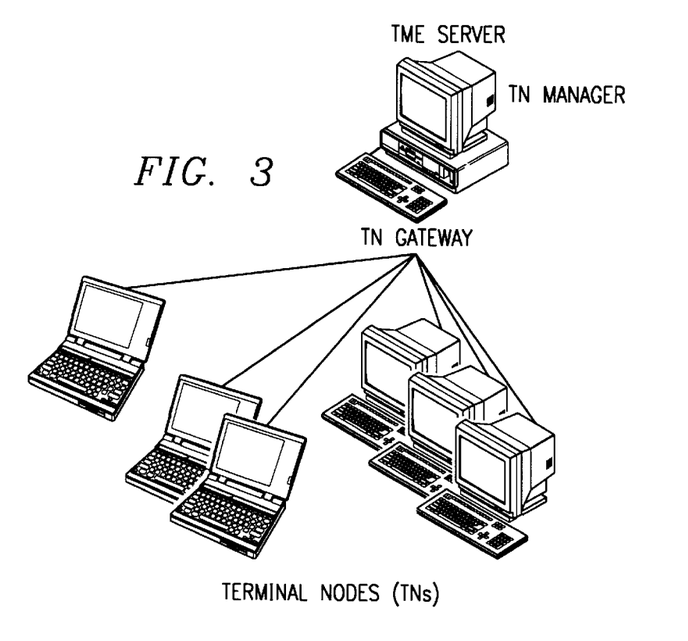
FIG. 3 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 3, a single server-class machine may be used as the server and gateway, and the client machines would run a low maintenance framework References herein to a distinct server and one or more gateway(s) should thus not be taken by way of limitation as these elements may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoint and gateway, and this mapping is preferably dynamic.

As noted above, there are one or more gateways per managed region. Preferably, a gateway is a fully-managed node that has been configured to operate as a gateway. Initially, a gateway "knows" nothing about endpoints. As endpoints login, the gateway builds an endpoint list for its endpoints. The gateway's duties preferably include: listening for endpoint login requests, listening for endpoint upcall requests, and (its main task) acting as a gateway for method invocations on endpoints.

Figure 2A:
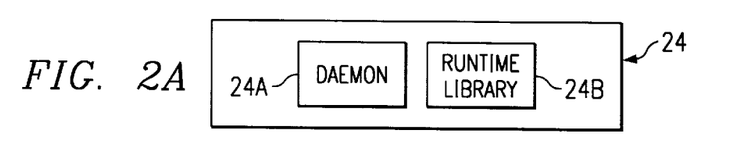
FIG. 2A is a block diagram of the elements that comprise the LCF client component of the system management framework.

As also discussed above, the endpoint is a machine running the system management framework client component, which is referred to herein as the low cost framework (LCF). The LCF has two main parts as illustrated in FIG. 2A: the LCF daemon 24a and an application runtime library 24b. The LCF daemon 24a is responsible for endpoint login and for spawning application endpoint executables. Once an executable is spawned, the LCF daemon 24a has no further interaction with it. Each executable is linked with the application runtime library 24b, which handles all further communication with the gateway.

Preferably, the server and each of the gateways is a computer or "machine." For example, each computer may be a RISC System/6000® (a reduced instruction set or so-called RISC-based workstation) running the AIX (Advanced Interactive Executive) operating system, preferably Version 3.2.5 or greater. Suitable alternative machines include: an IBM-compatible PC x86 or higher running Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, e.g., the IBM ThinkPad® machine, or some other Intel x86 or Pentium®-based computer running Windows '95 or greater operating system. IBM® or IBM-compatible machines running under the OS/2® operating system may also be implemented as the endpoints. An endpoint computer preferably includes a browser, such as Netscape Navigator or Microsoft Internet Explorer, and may be connected to a gateway via the Internet, an intranet or some other computer network.

Preferably, the client-class framework running on each endpoint is a low-maintenance, low-cost framework that is ready to do management tasks but consumes few machine resources (because it is normally in an idle state). Each endpoint may be "dataless" in the sense that system management data is not stored therein before or after a particular system management task is implemented or carried out.

This architecture advantageously enables a rational partitioning of the enterprise with 10's of servers, 100's of gateway machines, and 1000's of endpoints. Each server typically serves up to 200 gateways, each of which services 1000's of endpoints. At the framework level, all operations to or from an endpoint may pass through a gateway machine. In many operations, the gateway is transparent; it receives a request, determines the targets, resends the requests, waits for results, then returns results back to the caller. Each gateway handles multiple simultaneous requests, and there may be any number of gateways in an enterprise, with the exact number depending on many factors including the available resources and the number of endpoints that need to be serviced.

Figure 4:
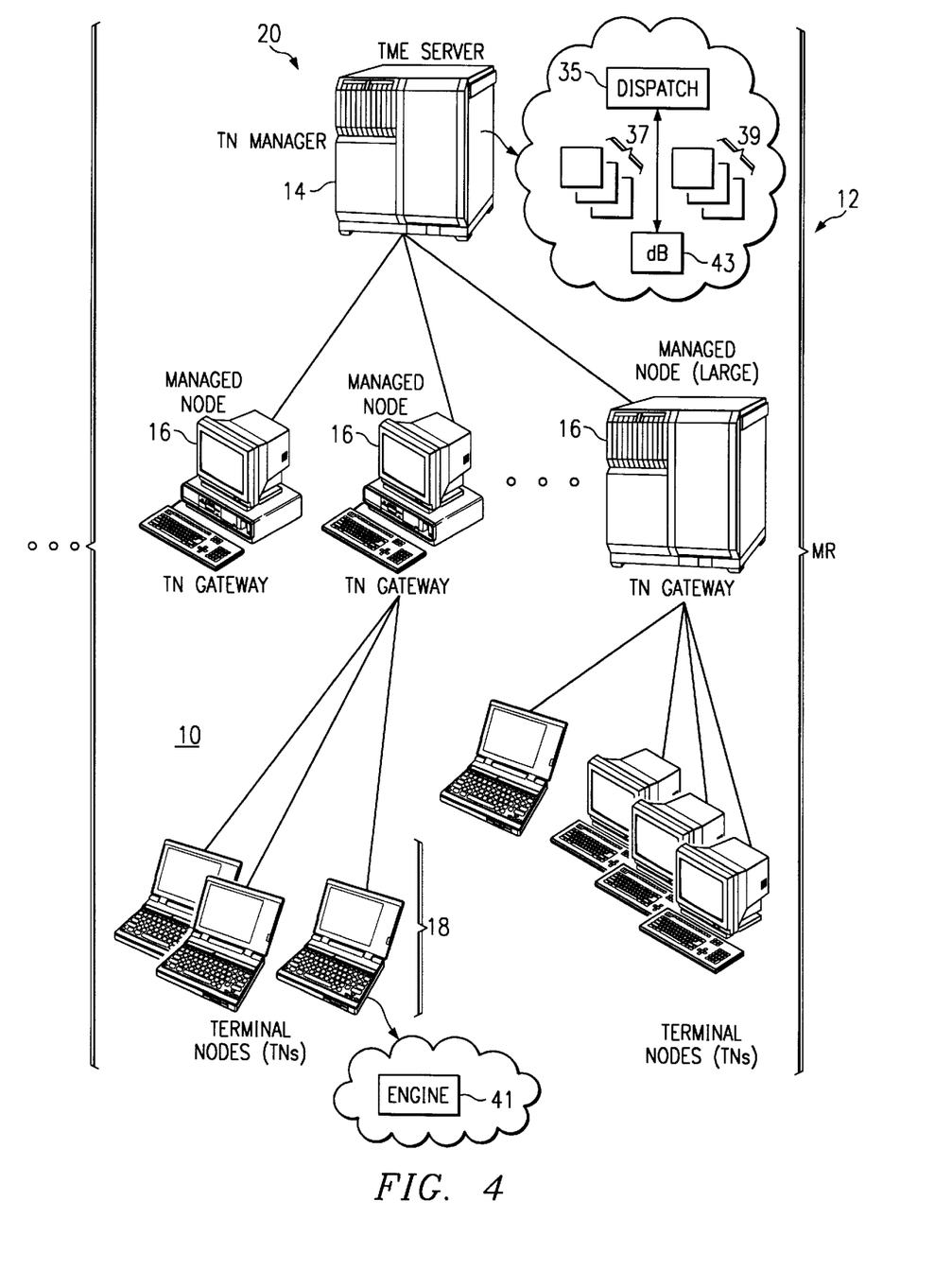
FIG. 4 is a distributed computer network environment having a management infrastructure for use in carrying out the preferred method of the present invention.

As distributed systems such as described above grow in size and complexity, management becomes more difficult. To facilitate system management, certain of the managed machines may include a uniform "engine" that executes one or more tasks (e.g., software "agents") that have been and/or distributed by a central mechanism. This architecture is illustrated in FIG. 4.

In this embodiment, a set of "software agents" 37 are available at a central location (e.g., manager 14) or at a plurality of locations (e.g., the gateways 16) in the network where administrative, configuration or other management tasks are specified, configured and/or deployed. The software agents are "mobile" in the sense that the agents are dispatched from a dispatch mechanism 35 and then migrate throughout the network environment. Generally, as will be seen, the mobile software agents traverse the network to perform or to facilitate various network and system management tasks. Alternatively, dispatch mechanism 35 may include a set of configurable software tasks 39 from which one or more agents are constructed. Manager 14 preferably also includes a database 43 including information identifying a list of all machines in the distributed computing environment that are designed to be managed. The dispatch mechanism itself may be distributed across multiple nodes.

At least some of the gateway nodes 16 and at least some of the terminal nodes 18 (or some defined subset thereof) include a runtime environment 41 that has been downloaded to the particular node via a distribution service. The runtime environment 41 includes a runtime engine (as well as other components) for a software agent as will be described. Software agents are deployable within the network to perform or to facilitate a particular administration, configuration or other management task specified by an administrator or other system entity. Preferably, the software agent is a piece of code executed by the runtime engine located at a receiving node. Alternatively, the software agent runs as a standalone application using local resources.

In a representative embodiment, both the runtime engine and the software agent(s) are written in Java. As is known in the art, Java is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser.

In one particular embodiment, a software agent is a Java applet (e.g., comprised of a set of Java "class" files) and the runtime environment includes a Java Virtual Machine (JVM) associated with a Web browser. In this illustrative example, various nodes of the network are part of the Internet, an intranet, or some other computer network or portion thereof.

When the administrator configures a task for deployment, the dispatch mechanism compiles the appropriate Java class files (preferably based on the task or some characteristic thereof) and dispatches the applet (as the software agent) in the network. An applet is then executed on the JVM located at a receiving node.

The above-described architecture provides for both proactive and reactive client/server management by providing a way to schedule and to respond to events received from applications and devices in the network. At the core of the service is the runtime engine that is used to interpret and evaluate event-oriented rules and launch response tasks. This same engine is also responsible for launching scheduled operations as well as executing software agents on demand.

Figure 5:
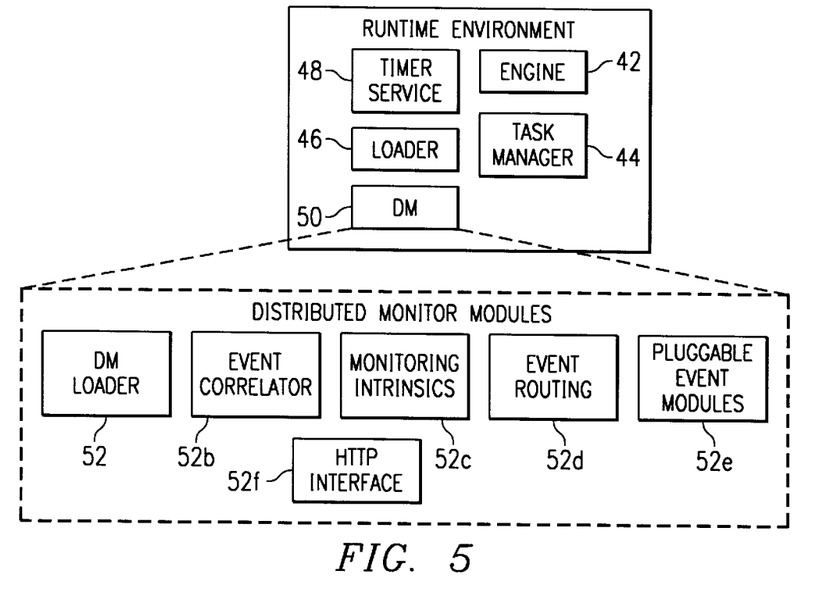
FIG. 5 is a block diagram illustrating a preferred runtime environment located at a managed machine within the distributed computer network.

The runtime environments located across a set of given managed machines collectively comprise a management infrastructure deployed throughout the computer network. FIG. 5 is a block diagram of a preferred runtime environment. The runtime environment is a platform-level service that can load and execute software agents. The environment 41 includes the runtime engine 42, a task manager 44, a loader 46, a timer service 48, and a distributed monitor 50. The distributed monitor (DM) 50 comprises a set of tasks or modules 52a–f run by the runtime engine 42 and that allow the environment to perform monitoring activities. The particular monitoring activities performed, of course, depend on the resources being managed, but typically such resources include storage devices and subsystems, printers, given programs and/or tasks, and any other managed resource. Generally, any such system, subsystem, device, resource, program or the like may be deemed a "managed object." If desired the runtime environment components may be used for activities other than monitoring (e.g., remote task execution).

The DM loader 52a controls the other DM modules. The event correlator 52b implements event correlation, preferably through use of a correlation agent that may be deployed to the monitor. A representative mobile correlation agent and method of use is described in Ser. No. 09/089,965, filed Jun. 3, 1998, and titled Method, System and Computer Program Product For Event Correlation In A Distributed Computer Environment" assigned to the assignee of this application. That application is incorporated herein by reference.

There may be a number of operations that many monitors will have in common. A set of these operations may be implemented as monitoring intrinsics (tasks) 52c, and these tasks are available to all monitor agents. They are preferably implemented in Java, thus if the distributed monitor invokes an intrinsic task the DM will already have the Java implementation for it. Moreover, monitor agents may take local action, remote action, or send an event in response to an out-of-tolerance condition, with local action strongly preferred. A monitoring agent is preferably defined with the response as an integral part. Because an agent may contain logic, it can make the desired measurements and then respond to the measured value appropriately (e.g., send event, send e-mail, run task, etc.). Available responses are not a fixed set, but rather another task in the agent. A set of response tasks are thus also provided as part of the monitoring intrinsics.

Routing is provided by the event router 52d. Pluggable event modules (PEMs) 52e are used to integrate new event sources/destinations with the other modules. A PEM is a task that may represent an event source, an event destination or both, and it is started when the distributed monitor 50 starts. The distributed monitor 50 may be optionally configured to perform basic HTTP server duties (e.g., servicing HTTP GET requests, where the URL of the GET may be a DM topology request, or a request for a status of a particular DM). The HTTP interface 52f is responsible for turning the requested data into HTML and returning it to the calling browser.

The runtime environment may be configured to load and run software agents at a startup time. When the environment has been configured to act as a distributed monitor, some or all of the modules 52 are loaded (by the DM loader 52a) depending on DM configuration data. Each module 52 then preferably configures itself at startup time and then begins its appointed task. After the environment has completed initialization, it periodically scans its timer list for scheduled work and waits for commands.

Figure 6:
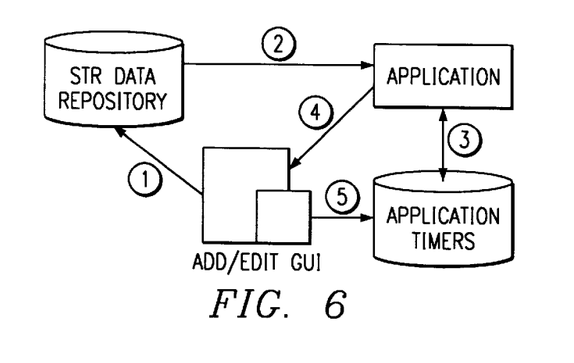
FIG. 6 is a block diagram of a distributed monitor timer repository (STR) and its associated library support according to the teachings of the present invention.

FIG. 6 illustrates the distributed monitor timer repository (STR) 15. As noted above, STR 15 comprises a set of objects and libraries used to support centralized definition and storage of time-related expressions referred to herein as "timers." According to the invention, a timer is a set of primitives (e.g., cycle, shortcycle, span) and a set of logical operators on those primitives. A cycle is a particular on/off transition pair that repeats at a given interval, in which case a timer may comprise a set of cycles that are combined with logic operators. In general, a timer thus is an expression of logical operators with a set of primitives as operands. Valid logical operators are preferably AND, OR, XOR and NOT, although other logical operations may be created from these operators. A low-level "schedule" is a set of timers with a label affixed to each timer. When an application queries a schedule for its value, it will return the label affixed to the first timer element that is active. A set of low-level "schedules" may be combined logically to create a high-level or higher level "schedule" as will be described below.

Figure 7:
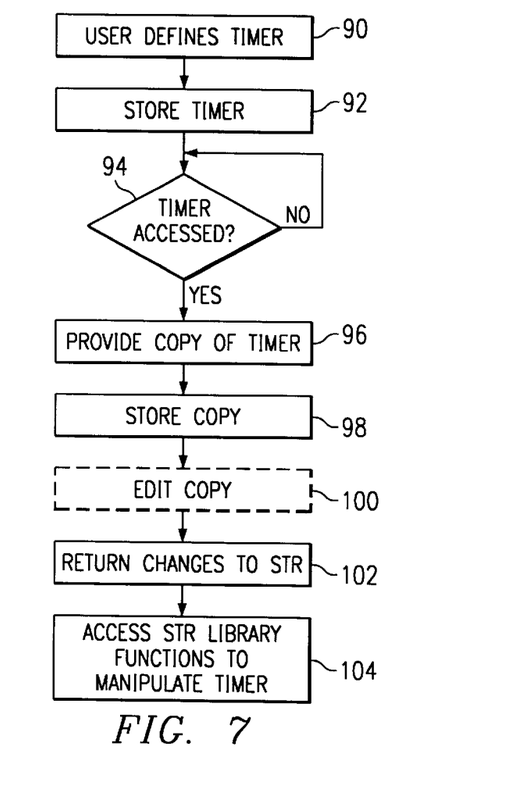
FIG. 7 is a flowchart of a preferred method for storing a timer in the STR and having an application retrieve that timer for use in a local operation.

Referring to FIG. 6 and the flowchart of FIG. 7, the process of defining and then retrieving a timer is illustrated. A user defines a timer (step 90) using a graphical user interface (GUI). GUI may be supported on the management server or elsewhere in the network. At step 92, the timer is stored in the STR data repository in a given hierarchy, as will be described below. At step 94, a test is performed to determine whether an application has accessed the STR data repository to retrieve a timer. If the outcome of the test at step 94 is negative, the routine cycles. If, however, the outcome of the test at step 94 is positive, the routine continues at step 96 with the application receiving a copy of the timer.

At step 98, the routine continues with the application storing a copy of the timer. Such storage may be persistent, but need not be. At step 100 the application user may optionally edit the timer. Thus, the application user may change its copy of the timer definition without regard to the STR. At step 102, the changes may be returned to the STR (to cause the changes to be reflected in the timer definition). If the timer definition at the STR changes after the application gets a copy of the definition for local use, the application will not see the change until it retrieves the value again. At step 104, the routine continues with the application using STR library functions to manipulate the timer.

Thus, timers are defined and stored centrally, with applications fetching copies of the definition for local use. The STR thus implements an application-independent definition/storage of time, as well as a very flexible definition of a timer. The timer definition can be timezone dependent or absolute (GMT). As discussed above, because the application has a copy of the timer's definition, it can change its copy without regard to the STR, or it can cause changes to the timer definition to be reflected in the STR (if the appropriate roles are present). By using the STR libraries, the same GUI used on the STR will be used in the application (STR libraries As will be seen immediately below, timers and primitives are organized in an indexed, hierarchical namespace, with each timer definition represented as a set of logical operators and operands. The operands are either other logical operators, or primitives referenced by name. Storing the primitives external to the timer definition minimizes the storage required in the expected use patterns, where a small set of primitives are combined in a large number of ways to construct the desired timers. An attempt to fetch a timer that refers to a non-existing primitive (or invalid logical operator) will cause an exception. This might occur if a timer is defined and subsequently a primitive referenced by the timer is deleted. Preferably, the STR will only check the validity of the references in certain circumstances, e.g., when a timer value is requested, or when the user adds a single timer to the repository.

Figure 8:
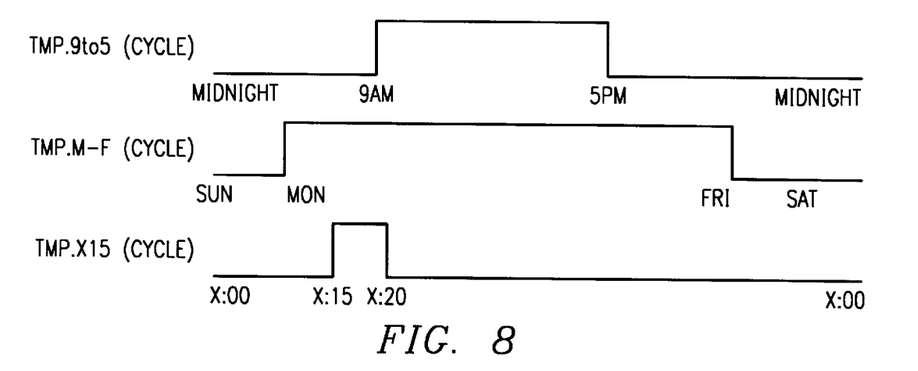
FIG. 8 is a graph of representative timer primitives useful in constructing a timer according to the present invention.

FIG. 8 illustrates three (3) representative primitives: "TMP.9to5", which is a cycle between 9:00 a.m. and 5:00 p.m., "TMP.M–F", which is a cycle between Monday and Friday, and "TMP.X15", which is a given 15 minute cycle. The above nomenclature is merely representative. Using several operands and these three primitives as examples, one can construct several different timers:

Timer(1): AND(TMP.9to5, TMP.M–F), representing weekdays from 9:00 a.m. to 5:00 p.m.;

Timer(2) AND(TMP.X15 AND (TMP.9to5, TMP.M–F)), representing every weekday at 15 minutes past the hour from 9:00 a.m. to 5:00 p.m.;

Timer(3) NOT(AND(TMP.9to5, TMP.M–F))

representing nights and weekends. When the user defines a primitive, the default behavior is for time to be relative to the timezone of the system that interprets it. When time is expressed in a timezone independent fashion (a synchronized global event), each primitive can indicate that it is relative to the system's timezone, or relative to GMT. If the TMP.9to5 cycle were relative to GMT, an on transition would occur at 3AM in Austin, Tex.

Timers (1)–(3), of course, are merely representative of the types of timer expressions that may be built using the set of primitives and operands described herein.

The present invention implements a namespace that can organize and efficiently locate a timer or primitive quickly. Timers and primitives are separately indexed (possibly stored separately also). Thus, e.g., a 2-level namespace (evenly distributed) would support 2500 items with a breadth of 50, which is manageable by modest GUI techniques without large lists. From a user's perspective, a two-part delimited string may be organized to represent the hierarchy, so the implementation may choose a one-tier index with dual hash entries, one for the full name and one for the first part of the delimited string. Thus, one implementation would use names delimited by a period (.), with the valid characters constrained to alpha, numeric and dash/underscore. By constraining the names in this way, serialization/de-serialization of a timer/primitive can be made simpler and somewhat more flexible.

The STR data structures reflect the minimal information required to describe a timer in a way that makes computation of a timer's current state and next transition as simple as possible. To support these goals, the primitives preferably are stored (persistently) and transmitted (e.g., to the requesting application) in one data structure, and internally represented (in the STR) by another data structure. The latter structure is optimal for computation. The computational data structures are supersets of the storage structures, with the extra fields added to reduce timer state computation requirements.

Representative data structures are as follows:

```
enum CyclePeriod {perSpan, perSec, perMin, perHr.,
    perDay, perWeek, perMon, perYear, perDayOfMon,
    per MonOfYear};
// The name of a Cycle is unique, and used as they
// key for storage within a table
struct Cycle {
        string          name;
        string          catalog;      // name of message
                                      catalog
        long            cat_idx;      // msg cat index for
                                      I18N label
        CyclePeriod     period;       // SEC, MIN, HR,
                                      DAY, WEEK . . .
        short           per_qual;     // period increment
                                      (15 MIN)
                                      // ignored if Span
        long            offset;       // start time rel.
                                      to period
        long            span;         // length of 'on' span
                                      in period
                                      or absolute off-
                                      time if Span
    }
// The name of a timer is used as the key as well
struct Timer }
        string          name;
        string          catalog;      // name of message
                                      catalog
        long            cat_idx;      // msg cat index for
                                      I18N label
        string          value;
        short           eval_tz;      // 1 = local TZ,
                                      0 = GMT
    }
```

Figure 9:
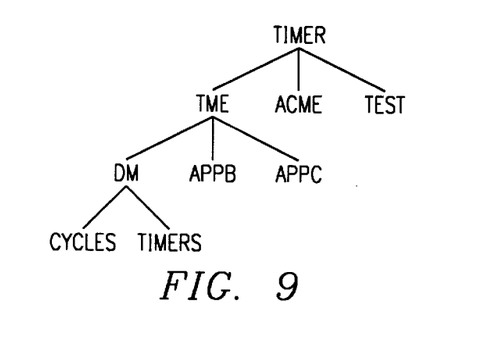
FIG. 9 is a representation of the repository hierarchy according to the present invention.

The repository preferably stores timer and primitive (e.g., cycle) definitions in a RDBMS. The RDBMS will store the data so that it appears to be hierarchical to the user, with a 4-level hierarchy that is illustrated in FIG. 9. Elements that are underlined are created when the repository is first installed (on behalf of the DM product). Elements that are not underlined are examples of where end-users may add cycle/timer definitions.

Each of the elements in FIG. 9 are preferably RDBMS tables, with a master table providing the mapping between the implied path and the RDBMS table name. This storage scheme allows new types of (timer-related) primitives to be added to the repository in the future. To store this information in the RDBMS there are three different RDBMS tables:

```
Master (
    name char(60) not null,
    table_name char(30) not null
    type int,
    state int
) primary key (name)
Cycle (
    name char(30) not null,
    catalog char(30),
```

```
        cat_idx int,
        period int,
        qual int,
        offset int,
        span int
    ) primary key (name)
    Timer (
        name char(30) not null,
        catalog char(30),
        cat_idx int,
        value char(1024) not null,
        eval_tz int
    ) primary key (name)
```

Figure 10:
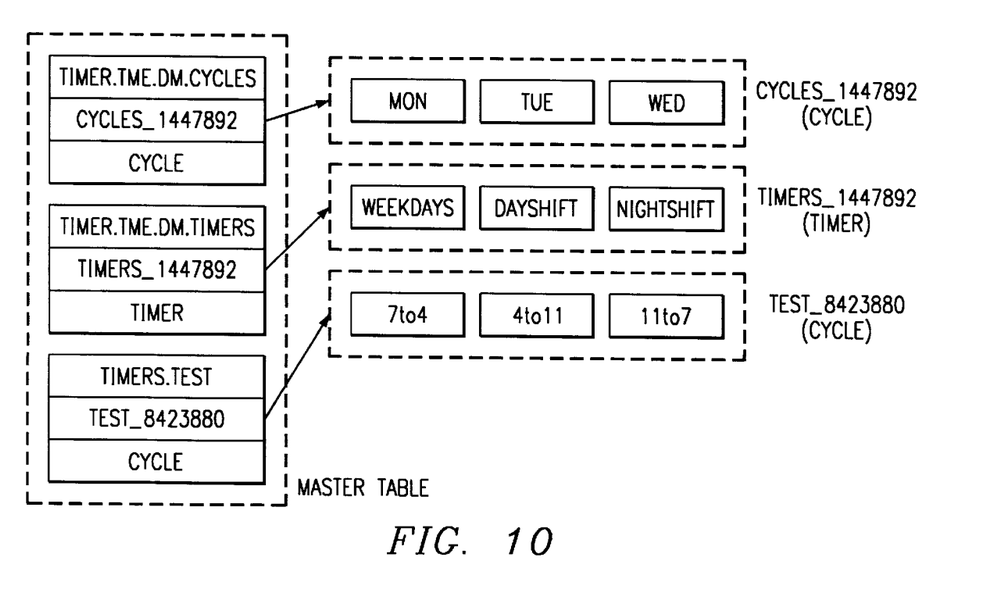
FIG. 10 is a representative table structure used in the STR repository hierarchy.

The relationships between the tables are shown in FIG. 10. As seen in this figure, the master table stores the user-defined name of table, and a RDBMS table name, which is computed by hashing the user-defined name (minus the base) and then appending the base name to the hash index.

Thus, there is preferably a single storage table with a fixed name. Entries in the storage table provide names for primitive and timer tables. This allows a set of default primitives and timers that can be easily updated, and it also lets the user define new groups of primitives and timers. When a timer refers to a primitive (or other timers), it must use the fully qualified name (Storage.table_name.Cycle.name). As noted above, table names for timers and primitives may be constrained to alpha, numeric, underscore and period. The period symbol will be used as a delineator between table name and primitive name, as well as a way to create the illusion of a >2 level hierarchy (by creating a table name with a period in it).

With all timer data stored centrally in this manner, the most common requests (e.g., from a DM) will be to fetch/serialize/transmit a timer. Timers and primitives may be changed serially (e.g., by GUI/CLI constraint) so multiple reader/single writer semantics should be observed. The data should be available for reading any time it is not being written. Preferably, read locks will not be used (stale data at the application may be common), and write locks preferably will only lock the timer/primitive as its new value is written to storage. Edit of a timer preferably will not create a lock on the primitives used by the timer. The longer a user leaves the GUI edit dialog open, the greater chance that another user will change the data that the GUI was loaded from. Thus, data is preferably fetched/stored in increments of one primitive/timer, the only lock is a semaphore indicating the data store is being changed, data held in a GUI during an edit can become stale without notice, and subsequent write of stale GUI data causes previous changes to be overwritten.

With the global namespace, it will be desirable to message active GUI dialogs to indicate a change to a primitive. It may be sufficient to let the user refresh the GUI on demand. A one-level undo facility for all changes may be used as well.

The current state and next transition time of a timer should be computed as efficiently as possible. Most actions will be triggered by the off-to-on transition of a timer; thus, computing transitions will be done frequently. If the primitive specifies GMT for the timezone, the when value is adjusted to GMT prior to the evaluation.

According to the invention, application support code provided by the timer service is optimized to compute the current state or next transition time of a list of timers. The computation structures assume that some of the timers share primitives (either cycles or timers), such that computing the current state of a list of timers will cause some primitives to be evaluated more than once for a given time-stamp. To take advantage of this, all cycles are preferably stored in a single array, indexed by fully-qualified name (with the same being true for timers) The following data structures are used during Timer computation.

```
CyclePeriod {perSpan = 0, perSec, perMin, perHr,
    perDay, perWeek, perYear,
    perDayOfMon, perMonOfYear};
enum PrimType {primNone = 0, primCycle, primLogical,
    primTimer};
enum TimerOp {opOr = 1, cpAnd, opXor, opNot};
typedef struct Cycle {
        enum CyclePeriod        period;
        short                   qual;
        long                    offset;
        long                    span;
        long                    last_test;
        int                     last_state;
        char                    *name;
} Cycle;
typedef struct Primitive {
        enum PrimType           type;
        int                     idx; /* Index into respective
                                        array */
} Primitive;
typedef struct Logical {
        enum TimerOp            op;
        struct Primitive        a;
        struct Primitive        b;
        long                    last_test;
        int                     last_state;
} Logical;
typedef struct Timer {
        char                    *name;
        short                   eval_tz;
        Logical                 **members;
        long                    last_test;
        int                     last_state;
} Timer;
```

The ALIGN-WITH operator will return the difference between the when value and the beginning of the period which contains when. The next_transition algorithms set forth below could use an optimization that states which transition is being searched for (on-off, off-on, either), which would remove some of the tests. Because next_transition is usually called from one state looking for the other state, this is a high-use optimization. The algorithms are set forth below:

State Evaluation of Cycle Primitive

> ind=(when ALIGN-WITH (cycle.period * cycle.per_qual)) if (ind<cycle.offset) || (ind>cycle.offset+cycle.span)) return (0) return (1)

Next Transition Evaluation of a Cycle Primitive

> ind=(when ALIGN-WITH (cycle.period * cycle.per-qual)) pstart= when−ind if (ind<cycle.offset) return(pstart+cycle.offset) if (ind>=cycle.offset) &:& (ind<cycle.offset+cycle.span) return (pstart+cycle.offset+cycle.span) return (pstart+(cycle.period * cycle.per_qual)+cycle.offset.

When a timer is fetched from the repository and sent to an application, it must serialize the primitives and logical operators into a single buffer that completely represents the timer's value. One or more timers may use the same primitives, so to minimize storage required for multiple timers, each timer should reference the primitives in a way that the primitive can be shares between multiple timers without making copies. Wire transmission can contain multiple copies of the same primitive, but the timer library functions should be able to de-serialize the data stream into structures/objects that do not require multiple copies of the same primitive. Because primitives and timers have a unique namespace, copies are detected by name. Preferably, cycles are not used directly by applications except as a primitive of a timer during computation. Preferably, an application does not refer to a cycle by name.

Most of the STR is thus implemented at the repository, with a smaller amount of code linked into applications via a STR library. As noted above, one goal of the STR design is to a common data representation of a timer that all applications can use, with the STR libraries providing the required interfaces to the data structure. Thus, the structure is opaque to the application. Appropriate management interfaces may be readily specified for defining/editing entries in the repository, and for maintaining the repository.

As described above, a set of timers may be combined to describe a schedule. According to the invention, it is also desirable that a set of schedules may be combined, e.g., by Boolean arithmetic, to generate higher order schedules. Applications may provide such facilities via implicit layering or scheduling policy mechanisms.

In the preferred embodiment, time values are measured in seconds. Absolute time will be based on the UNIX standard "time 0", 00:00UST Jan. 1, 1970. A single cycle has start/stop times, a "wavelength" (overall duration of one cycle), and then a description of the "shape" of the waveform. The model for schedule queries is something that answers "yes/no" questions for points in time, so the waveform consists of "on" times separated by periods of "off" time.

The start and stop times for a cycle will in general be interpreted as offsets. Often, they will be intended as offsets from time 0; in other words, absolute times. A cycle waveform description is either a simple tuple giving a delay and a duration, or else a list of sub-cycles. In the simple case, the waveform will be "off" from the start of the cycle for as many seconds as indicated by the delay value, and then "on" for the given duration. (Because the wavelength might be longer than delay+duration, there might be more "off" time after the pulse.) Such a scheme would be appropriate for some action that is supposed to happen on a regular basis; an hourly schedule would have a wavelength of 3600 seconds, and a waveform with a 0 second delay and a 1 second "on" pulse. If a waveform is a list of sub-cycles, then a more complicated waveform can be described. The start/stop times of each sub-cycle are interpreted relative to the beginning of the enclosing cycle.

The basic schedule query is "Relative to time base $t_b$ is time $t_q$ on or off?" In order to answer this question, the following process should suffice:

Query (schedule S, time Tb, time Tq, time Tr):
S is the schedule
Tb is the time base
Tq is the query time
Tr is the time resolution
Let offset time To=((Tq−Tb) IDV Tr) * Tr
If To<S.start or To>S.stop
return "off"
It S.wlen ==0
return "on"
Let Tm=To MOD S.wlen
for each waveform sub-cycle C do
if Query (C, 0, Tm, Tr) =="on"
return "on"
return "off"

The interpretation process is simple. First, the start/stop times are examined to determine whether the query time falls within the range of the schedule at all. If so, and the wavelength of the schedule is zero, then it must be a simple one-shot schedule and so the answer must be "on". If not, then each sub-cycle in turn is checked recursively. Note that the offset time (the time between the base reference time and the query time) is first modulo reduced by the cycle wavelength before being fed to the recursive calls.

Because the basic operation with schedules as described so far gives a simple on/off result, an easy way to build up more complicated schedules is to just combine factors in Boolean expressions. Thus, for example, to express a schedule like "hourly on the half-hour, except on weekends or holidays", one simply needs a primitive (i.e. a cycle) for the "regular" part and then a couple of cycles for the weekends and holidays (the holiday "cycle" might have a wavelength of a year and then a list of explicit one-shift sub-schedules for each specific day).

A schedule may be set up in one of two preferred ways: "active" schedules and "mask" schedules. An active schedule is one that contains "on" time-points that identify when some action should happen or when some condition is true. Any timer that periodically inspects the schedule will do so at a regular frequency (the "Tr" value in the algorithm shown above. The schedule, therefore, only needs to have a one-second wide window to express an "on" condition. Any time that examines the schedule will get a "yes" response to the basic query during the time period that surrounds the actual single second that the schedule says is "on".

A mask schedule, on the other hand, is a blanket description of a time period. A mask would generally be used to filter basic active schedules, perhaps in conjunction with other masks. Thus, a mask schedule expresses things like "Wednesday is backup day", or "no inventory cycles on weekends".

Both types of schedules are preferably represented by the same structure. Preferably, mask schedules will be constructed to implement some visible "restriction" features that will hide the low-level schedule construction, namely, the "raw" Boolean expression capabilities of the scheduling mechanisms. An application programming interface (API) may be provided to allow schedule expression structures to be built up by a series of calls to "operator" functions. In other words, to build an expression for "hourly except Thursdays", an application would build simple cycles for "hourly" and "all day every Thursday", and then call a function to glue them together with opANot and return a SchedExpr structure.

The present invention provides numerous advantages. A given "timer" is individually manageable and easily configurable in numerous ways. Timers and their primitives are preferably stored in a hierarchical namespace for ease of retrieval and use. In response to requests from a managed computer, a timer is selectively retrieved and/or built from the namespace and transmitted to the computer for local use. Individual timers are built as expressions of simple logical operations with a set of one or more primitives as operands. This "building block" approach dovetails efficiently with the software component-based "agent" mechanism wherein individual Java-based components are deployable into the network and executed locally (in runtime engines) to perform time-based management tasks.

One of the preferred implementations of the inventions is as a computer program product, namely, a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

Having thus described our invention, what we claim as new and desire to secure by letters patent is set forth in the following claims:

What is claimed is:

1. A method of managing time expressions for use by applications in a distributed computer network having a management server servicing a set of managed computers, comprising the steps of:

defining a set of timers, each timer comprising an expression of logical operators with a set of one or more primitives as operands; and storing the set of timers in a hierarchical namespace associated with the management server.

2. The method of managing time expressions as described in claim 1 wherein the timers and primitives are stored separately in the hierarchical namespace.

3. The method of managing time expressions as described in claim 2 wherein the primitives are indexed by name.

4. The method of managing time expressions as described in claim 1 wherein at least a first timer and a second timer share at least one primitive.

5. The method of managing time expressions as described in claim 1 wherein the logical operators are selected from the group of logical operators AND, OR, XOR and NOT.

6. The method of managing time expressions as described in claim 1 wherein a primitive defines a cycle.

7. The method of managing time expressions as described in claim 6 wherein the cycle is represented by an on/off transition pair that repeats at a given interval.

8. The method of managing time expressions as described in claim 7 wherein the on/off transition pair is a given time period.

9. The method of managing time expressions as described in claim 1 wherein a given set of timers comprise a schedule.

10. A method of managing time expressions in a distributed computer network having a management server servicing a set of managed computers, comprising the steps of:

storing a set of timers in a hierarchical namespace associated with the management server, each timer comprising an expression of logical operators with a set of one or more primitives as operands; and selectively retrieving a timer for use in a local managed computer.

11. The method of managing time expressions as described in claim 10 wherein the timers and primitives are stored separately in the hierarchical namespace.

12. The method of managing time expressions as described in claim 10 wherein the primitives are indexed by name.

13. The method of managing time expressions as described in claim 10 wherein the logical operators are selected from the group of logical operators AND, OR, XOR and NOT.

14. The method of managing time expressions as described in claim 10 wherein given timers comprise a first level schedule.

15. The method of managing time expressions as described in claim 14 further including the step of logically combining at least a pair of first level schedules to generate a second level schedule.

16. A method of generating a master schedule for use by an application in a distributed computer network having a management server servicing a set of managed computers, comprising the steps of:

defining at least first and second schedules from a set of timers organized in a hierarchical namespace associated with the management server, each timer comprising an expression of logical operators with a set of one or more primitives as operands; and combining the first and second schedules to form the master schedule.

17. The method as described in claim 16 wherein the first and second schedules are combined by a logical operation.

18. The method as described in claim 17 wherein the logical operation is a Boolean operation.

19. A hierarchical namespace, in computer-readable media, for use by applications in a distributed computer network to manage time expressions, the hierarchical namespace being associated with a management server in the distributed computer network, the management server servicing a set of managed computers, the hierarchical namespace comprising:

a set of timers each comprising an expression of logical operators with a set of one or more primitives as operands;

wherein the timers and primitives are stored separately and the primitives are indexed by name.

20. The hierarchical namespace in computer-readable media as described in claim 19 wherein the logical operators are selected from the group of logical operators AND, OR, XOR and NOT.

21. The hierarchical namespace in computer-readable media as described in claim 19 wherein a primitive defines a cycle.

22. The hierarchical namespace in computer-readable media as described in claim 21 wherein the cycle is represented by an on/off transition pair that repeats at a given interval.

23. The hierarchical namespace in computer-readable media as described in claim 22 wherein the on/off transition pair is a given time period.

24. A computer program product for use in a computer connected in a distributed computing environment having a management server servicing a set of managed computers, comprising:

means for storing a set of timers in a hierarchical namespace associated with the management server, each timer comprising an expression of logical operators with a set of one or more primitives as operands; and means for retrieving a timer for use in a local managed computer.

25. The computer program product as described in claim 24 further including means for updating a timer.

26. The computer program product as described in claim 24 wherein the retrieving means includes means for serializing and transmitting the timer to the local managed computer.

27. The computer program product as described in claim 24 further including means for computing a current state of a timer.

28. The computer program product as described in claim 24 further including means for computing a next transition time of a timer.

29. A computer connected within a distributed computing environment servicing a set of managed computers, comprising:

a processor;

a memory;

a hierarchical namespace supported in the memory for storing a set of timers;

means for specifying each timer as an expression of logical operators with a set of one or more primitives as operands; and means responsive to a given request for retrieving a timer from the hierarchical namespace for use in a managed computer.

* * * * *